United States Patent [19]

Rollhaus, Jr. et al.

[11] Patent Number: 5,495,527
[45] Date of Patent: Feb. 27, 1996

[54] TELEPHONE PRIVACY DEVICE

[75] Inventors: Philip E. Rollhaus, Jr., Chicago, Ill.; Chris DelPlato, Hackettstown; James Ryan, Andover, both of N.J.; Eric Knutsen, Scarsdale, N.Y.

[73] Assignee: Ouixote Corporation, Chicago, Ill.

[21] Appl. No.: 258,097

[22] Filed: Jun. 10, 1994

[51] Int. Cl.$^6$ .................................................. H04M 1/60
[52] U.S. Cl. ...................... 379/387; 379/391; 379/395; 379/396; 381/100; 381/104; 381/107
[58] Field of Search ................................ 379/387, 395, 379/396, 391; 381/100, 104, 107, 109

[56] References Cited

U.S. PATENT DOCUMENTS

| | | |
|---|---|---|
| 1,529,537 | 3/1925 | Carman et al. . |
| 2,020,970 | 11/1935 | Scher . |
| 2,131,820 | 10/1938 | Scher . |
| 2,245,724 | 6/1941 | Scher . |
| 2,540,873 | 2/1951 | Florman . |
| 2,842,623 | 7/1958 | Lehr . |
| 3,180,937 | 4/1965 | Moser . |
| 3,668,320 | 6/1972 | Duck ........................ 379/395 |
| 4,151,376 | 4/1979 | Walker, Jr. .................. 379/395 |
| 4,160,122 | 7/1979 | Jacobson .................... 379/395 |
| 4,191,861 | 3/1980 | Walker, Jr. .................. 379/442 |
| 4,773,088 | 9/1988 | Matheny ..................... 379/395 |
| 4,894,863 | 1/1990 | Navratil et al. .............. 379/387 |
| 4,975,949 | 12/1990 | Wimsatt et al. .............. 379/396 |
| 5,315,662 | 5/1994 | Hayashi et al. .............. 381/107 |

OTHER PUBLICATIONS

"Ignition Revolution" OS/2 For Corporate America, Mar. 1994, pp. 27, 29, 31.
"Disguise your voice when answering the phone, and discourage unwanted calls" (Mar., 1994).

*Primary Examiner*—Jeffery Hofsass
*Assistant Examiner*—Jacques M. Saint-Surin
*Attorney, Agent, or Firm*—Willian Brinks Hofer Gilson & Lione

[57] ABSTRACT

A telephone privacy device includes first and second connectors that are mateable with a telephone handset and a telephone base, respectively. The handset includes a microphone, and the device includes a variable amplifier that allows the user to amplify the microphone signal to a desired level prior to sending it on to the base. A signal strength display allows the user to monitor the amplitude of the amplified microphone signal. A side tone suppression circuit generates a side tone suppression signal in response to the amplified microphone signal. This side tone suppression signal is used to reduce excessive side tone from the telephone base. An adjustable gain amplifier amplifies the speaker signal supplied by the base for the handset speaker.

22 Claims, 4 Drawing Sheets

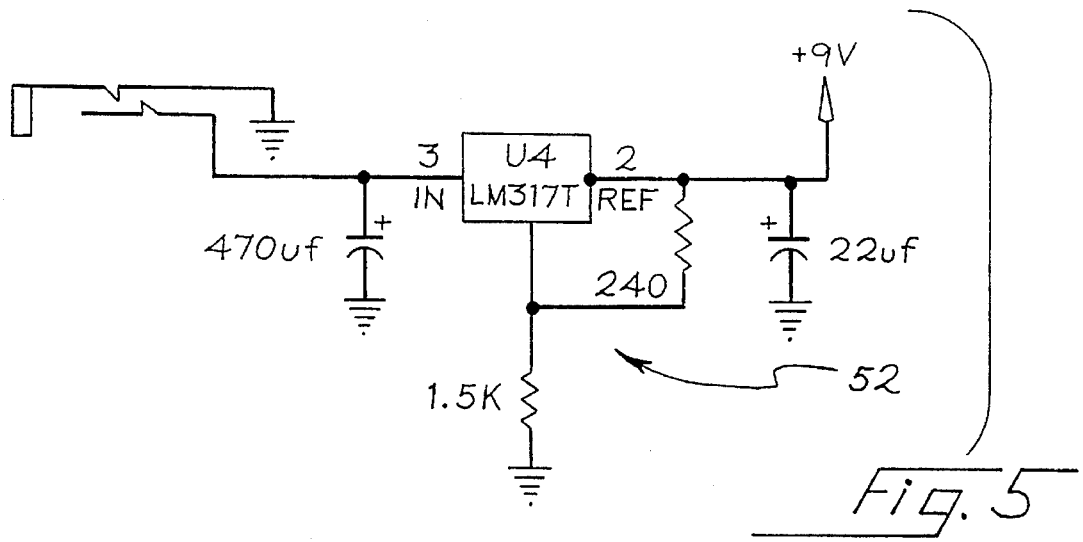
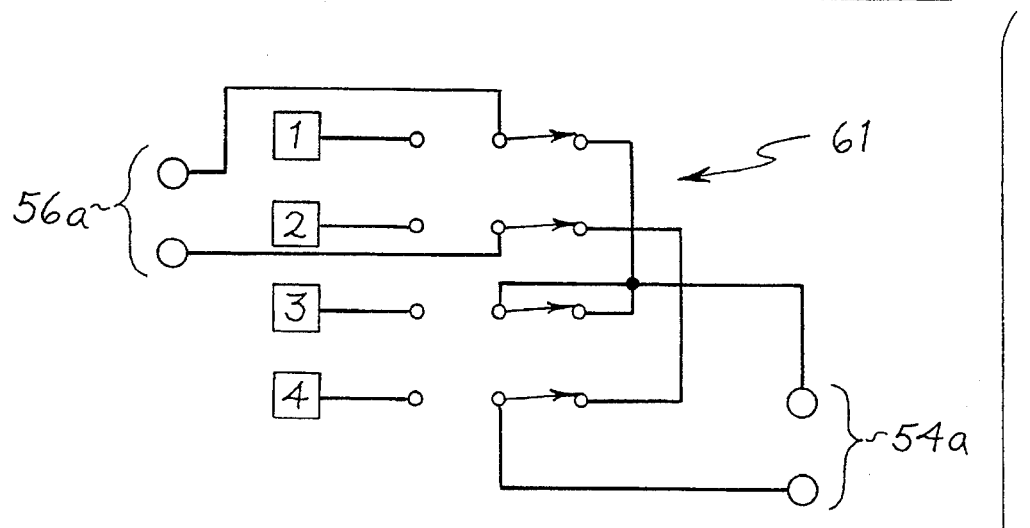
Fig. 5
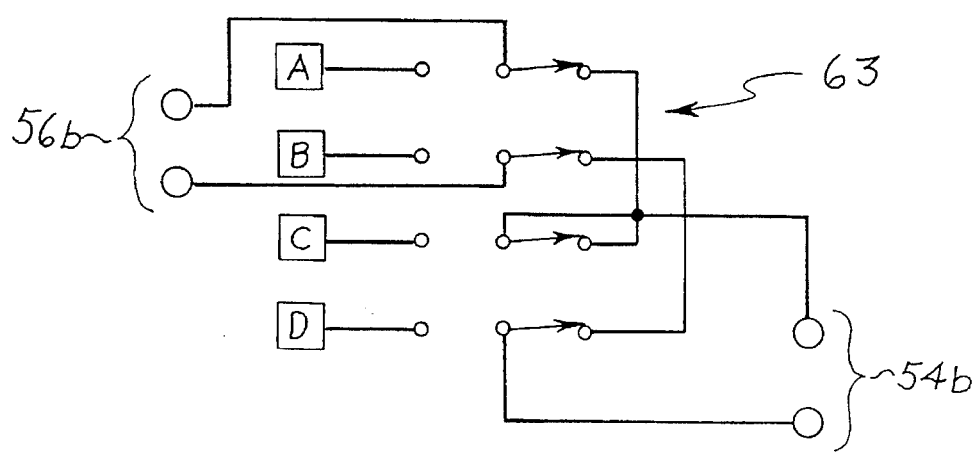

TELEPHONE PRIVACY DEVICE

BACKGROUND OF THE INVENTION

This invention relates to a telephone privacy device that allows a user to reduce the amplitude of his voice while still communicating effectively via telephone.

Telephone privacy is an increasing problem in many settings. For example, public telephones are now available on commercial airliners, and a number of potential problems are associated with such telephones. When a user speaks into such a telephone at a normal speaking voice, it may be possible to overhear the user. Additionally, a normal telephone speaking voice may be excessively loud in such a setting, it may irritate others in the vicinity.

Telephones are also used to a greater and greater extent in the work place. Telephone users are often in close physical proximity to one another. One user may be overheard by another user, or may actually create a nuisance for another user. These problems will be exacerbated as telephones are used more and more to allow users to interact with computers.

Thus, a need exists for a telephone privacy device that can be used both to increase telephone privacy and to reduce the speech volume that is heard by third parties in the vicinity.

SUMMARY OF THE INVENTION

According to a first aspect of this invention, a telephone privacy device includes first and second connectors configured to connect the device to a handset and to a base of a telephone. A variable amplifier receives a microphone signal from the handset via the first connector and generates an amplified microphone signal. This variable amplifier comprises an adjustable volume control element effective to adjust amplification of the variable amplifier. The amplified microphone signal is then transmitted to the base via the second connector. A signal strength display is connectable to respond to the amplified microphone signal to provide a visual indication of signal strength of the amplified microphone signal to the user.

In operation, the user can adjust the volume control element so as to amplify his voice and thereby speak at a reduced volume. The user can monitor the signal strength display to insure that the amplified microphone signal actually supplied to the telephone base has an adequate signal strength.

According to a second aspect of this invention, a telephone privacy device having first and second connectors and a variable amplifier as discussed above also includes a second amplifier responsive to a speaker signal from the second connector and operative to supply an amplified speaker signal to the first connector. A side tone suppression circuit having an input responsive to the amplified microphone signal and an output coupled to the second amplifier supplies a side tone suppression signal to the second amplifier that varies in amplitude in response to the amplified microphone signal. In this way, the user is prevented from hearing an excessive side tone signal as a result of the amplification of the variable amplifier.

According to a third aspect of this invention, a telephone privacy device having first and second connectors, a variable amplifier, and a second amplifier as described above utilizes a second amplifier having a gain substantially independent of the adjustable volume control element. In this way, the user is allowed to adjust the amplification of the microphone signal without altering the gain of the second amplifier that processes the speaker signal.

BRIEF DESCRIPTION OF THE DRAWINGS

FIGS. 3, 4 and 5 together make up an electronic schematic diagram of the telephone privacy device of FIGS. 1 and 2.

DETAILED DESCRIPTION OF THE PRESENTLY PREFERRED EMBODIMENTS

Figure 1:
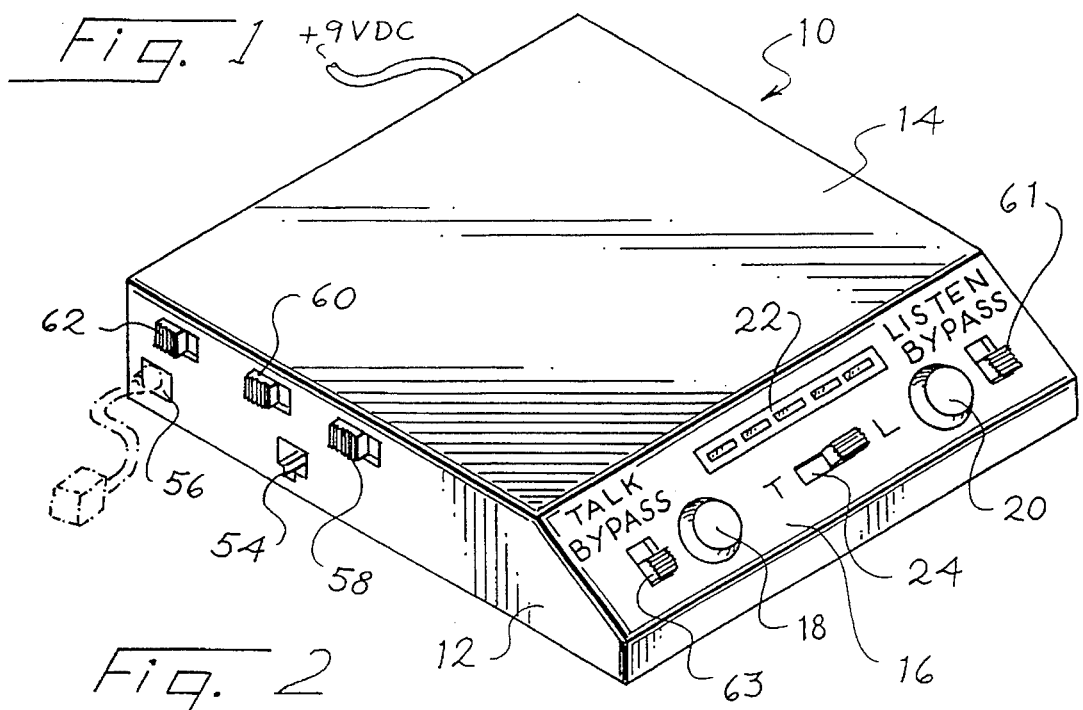
FIG. 1 is a perspective view of a telephone privacy device that incorporates a preferred embodiment of this invention.

Turning now to the drawings, FIG. 1 shows a perspective view of a telephone privacy device 10 that incorporates a preferred embodiment of this invention. The device 10 includes a housing 12 having a top surface 14 and a front panel 16. The top surface 14 is preferably sized to support a telephone base (not shown) of a conventional type.

The front panel 16 presents a number of controls and a display to the user, including a microphone volume control 18, a speaker volume control 20, a signal strength display 22, a display switch 24, and two bypass switches 61, 63.

The housing also includes two connectors 54, 56, which in this embodiment are conventional modular telephone receptacles. The connectors 54, 56 are used as described below to interconnect the privacy device 10 between a telephone base and handset.

Figure 2:
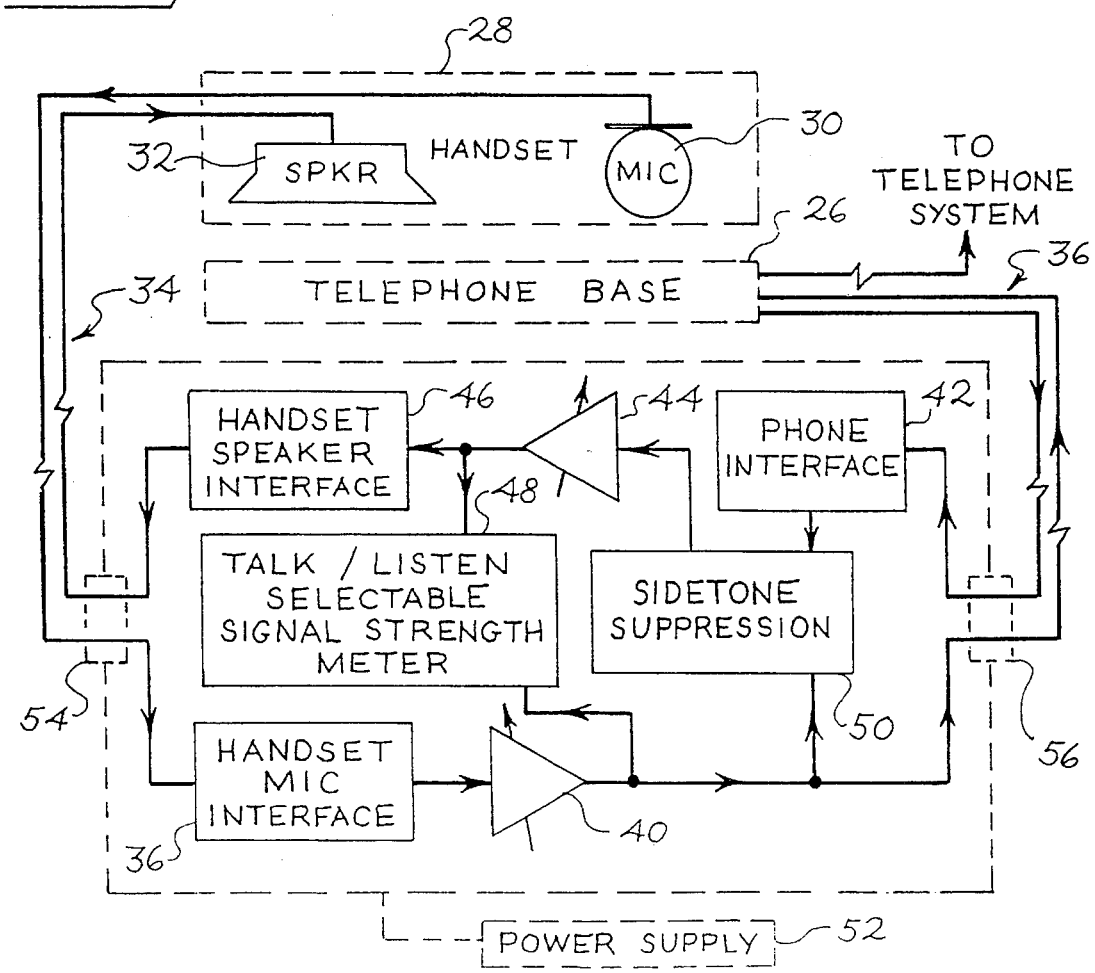
FIG. 2 is a block diagram of the telephone privacy device of FIG. 1.

FIG. 2 is a block diagram that shows the privacy device 10 interconnected between a telephone base 26 and a telephone handset 28. The handset 28 includes a microphone 30 and a speaker 32 in the conventional manner. The handset 28 is connected to the privacy device 10 by a cable 34 which terminates in a conventional modular telephone plug that mates with the connector 54. Similarly, the telephone base 26 is connected via a cable 36 with the privacy device 10. The cable 36 also terminates in a conventional modular telephone plug that mates with the connector 56.

The microphone 30 generates a microphone signal that is applied to a microphone interface 36. The interface 36 includes switches 58, 60 (FIG. 3) that allow the user to select the desired polarity for the microphone signal, and to apply a selected impedance to the microphone signal line. The switches 58, 60 are typically set initially when the privacy device 10 is put into service in order to adapt the privacy device 10 for the particular handset microphone 30 that is in use.

Figure 3:
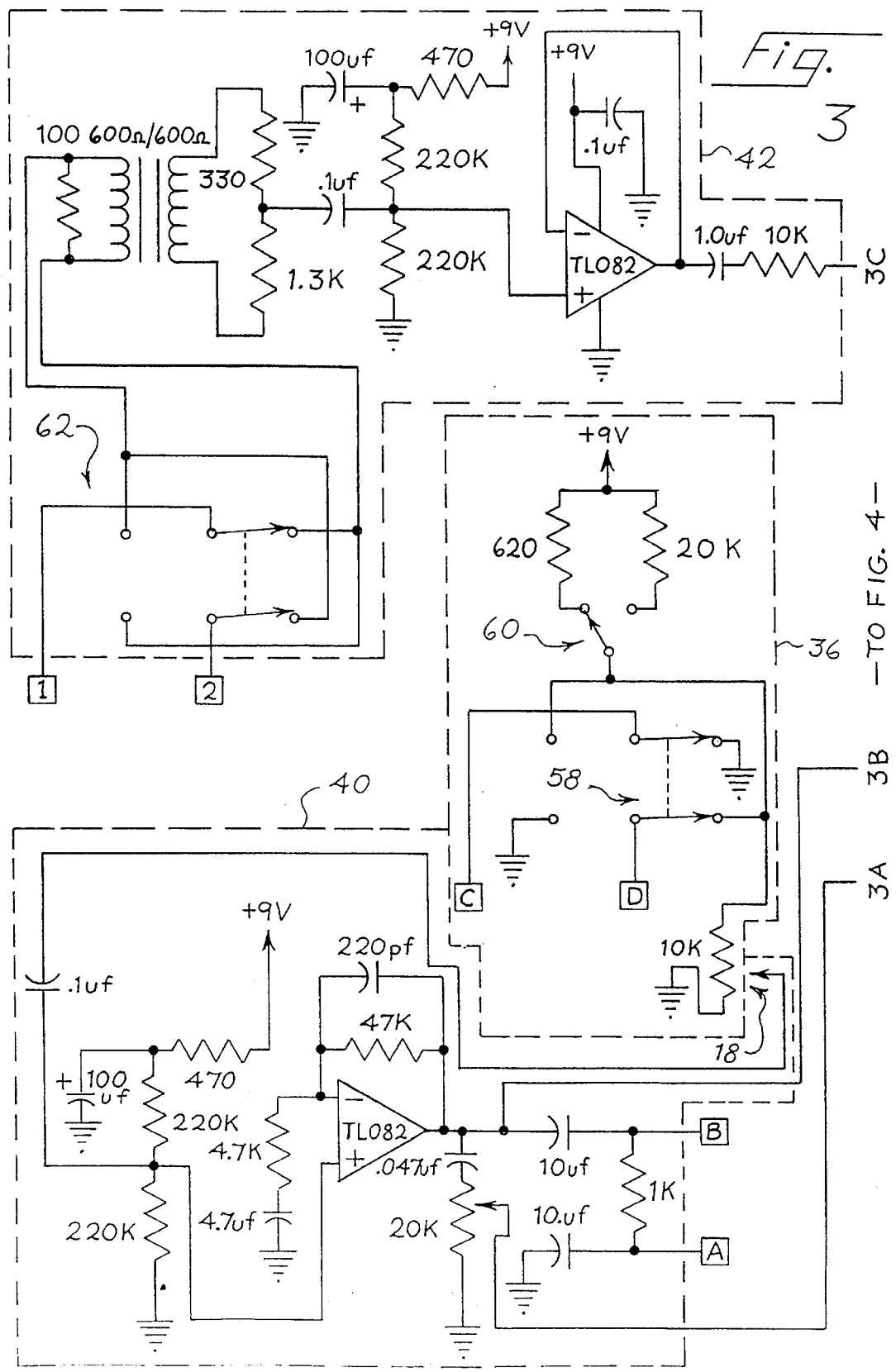

Returning to FIG. 2, the microphone interface 36 generates an output signal that is applied to a talk amplifier 40. As shown in FIG. 3, the talk amplifier 40 includes a manually adjustable potentiometer, which forms the microphone volume control 18. The user can amplify the incoming microphone signal to an adjustable degree by properly manipulating the microphone volume control 18. The output of the talk amplifier 40 is an amplified microphone signal that is applied via the connector 56 and the cable 36 to the telephone base 26.

In addition, a signal strength meter 48 and a side tone suppression circuit 50 are responsive to the amplified microphone signal generated by the talk amplifier 40.

Figure 4:
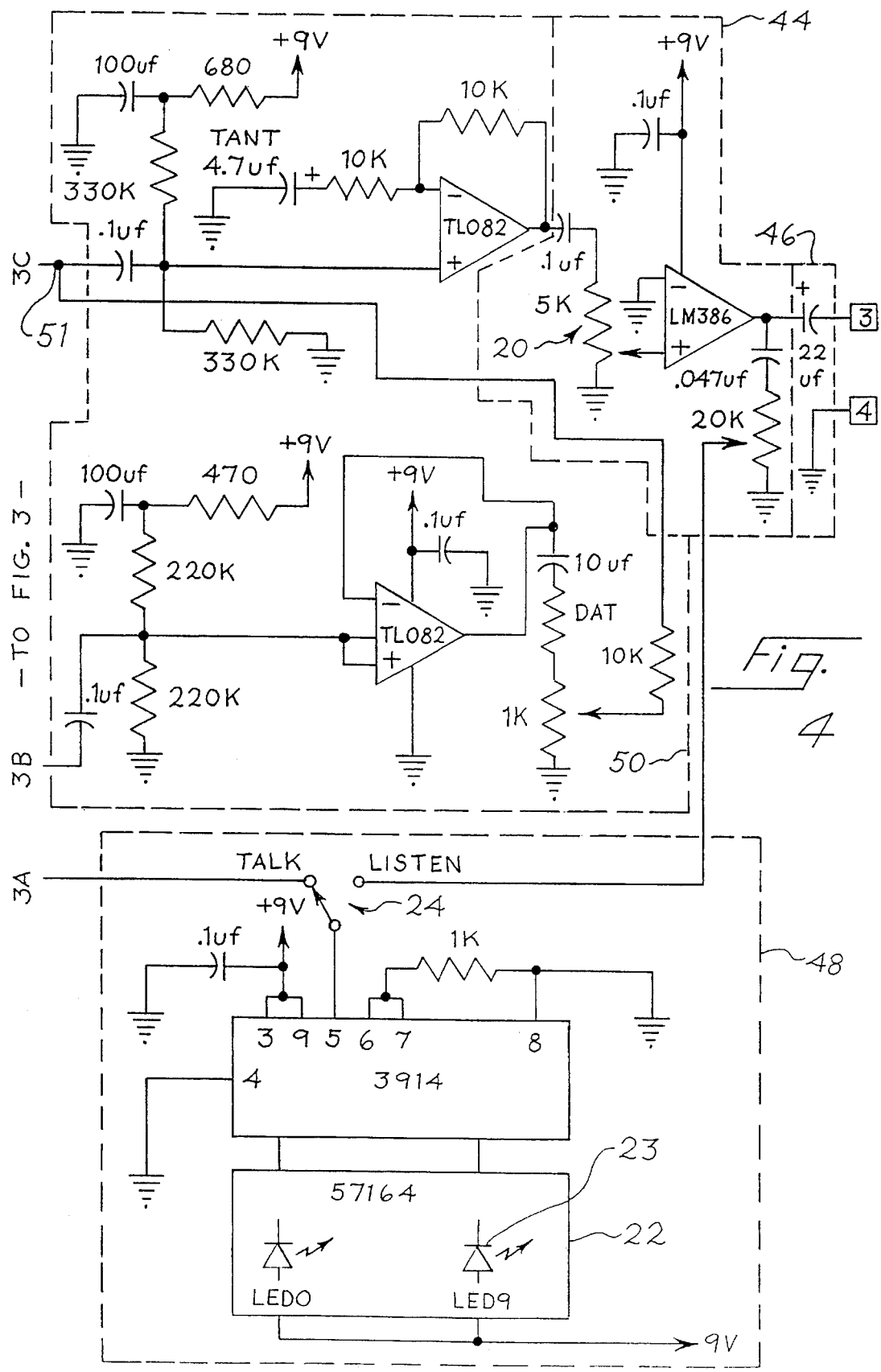

As shown in FIG. 4, the signal strength meter 48 includes the display switch 24 discussed above. When the display switch 24 is in the position shown in FIG. 4, a signal that varies in accordance with the amplified microphone signal is applied to an integrated circuit 3914 that in turn drives the display 22. The display 22 includes ten separate LED's 23, which are illuminated in the manner of a VU meter to indicate the volume or amplitude of the amplified microphone signal. Thus, the user can gauge the volume of the amplified microphone signal that is supplied to the telephone base 26 with the signal strength meter 48. For example, the user can first select a reduced volume speaking voice appropriate for a particular situation, and then adjust the amplification of the talk amplifier 40 with the microphone volume control 18 until the signal strength meter 48 indicates that the amplified microphone signal is of a suitable volume for the telephone base 26.

The side tone suppression circuit 50 is also responsive to the amplified microphone signal generated by the talk amplifier 40. The side tone suppression circuit 50 generates a signal that varies in amplitude in accordance with the amplified microphone signal, and is applied to a summing node 51 (FIG. 4) as described below in greater detail.

Returning to FIG. 2, the privacy device 10 also includes a telephone interface 42 that receives a speaker signal from the telephone base 26 via the cable 36 and the connector 56. The telephone interface 42 is shown in detail in FIG. 3, and it includes a phase switch 62 that allows the user to select one of two phases separated by 180° for the speaker signal. The speaker signal is then passed through a transformer and a buffer included in the telephone interface 42.

As shown in FIG. 4, the buffered speaker signal is then applied to the summing node 51, which also receives a signal from the side tone suppression circuit 50. The resulting sum of these two signals is amplified and then applied to a listen amp 44 which amplifies the speaker signal to a variable degree, as dictated by the user. The speaker volume control 20 operates to alter the amplifier gain of the listen amp 44, and therefore the amplitude of the speaker signal, independently of the microphone volume control 18.

The signal strength meter 48 receives as a second input a signal responsive to the amplified speaker signal. The user can selectively apply this signal related to the amplified speaker signal for display via the display switch 24.

The amplified speaker signal supplied by the listen amp 44 is also applied via the handset speaker interface 46, the connector 54 and the cable 34 to the handset speaker 32.

In FIGS. 3 and 4, reference signals 54a and 54b designate two portions of the connector 54 of FIG. 2. Similarly, reference symbols 56a and 56b of FIG. 3 represent two portions of the connector 56 of FIG. 2.

A power supply 52 supplies power to the privacy device 10. For example, the power supply 52 can be a conventional wall mounted power supply that converts 115 VAC to 9 VDC.

The bypass switches 61 and 63 (FIG. 5) allow a user to bypass the circuitry of FIGS. 3 and 4 and to interconnect the talk and listen circuits of the base 26 directly to the handset 28.

The side tone suppression circuit 50 reduces what would otherwise be an excessive side tone signal generated by the telephone base 26. In particular, a conventional telephone base will generate a side tone signal that is added to the speaker signal in order to feed back a portion of the microphone speaker to the speaker signal. Such side tone signals have been found to be preferable to most users. The privacy device 10 allows the user to alter the gain of the talk amplifier 40. For example, if the talk amplifier 40 increases the volume of the amplified microphone signal by a factor of three as compared to the original microphone signal, the amplified microphone signal would result in a side tone signal approximately three times greater than desired. The side tone suppression circuit 50 overcomes this problem by applying a side tone suppression signal at the summing node 51 to cancel the excessive portion of the side tone signal generated by the telephone base 26. This is accomplished by supplying the side tone suppression signal in counter phase to the side tone signal of the telephone base. The phase reversing switch 62 in the telephone interface 42 allows the appropriate phase relationship to be obtained.

The telephone privacy device 10 described above provides a number of important advantages. First, it connects to most telephone handsets and bases using standard modular telephone plugs and receptacles, and no rewiring is required. The privacy device 10 provides separate amplification controls for both the talk and the listen circuits. This provides considerable flexibility to the user. The device 10 has a switchable signal strength meter which allows the user to set the gain accurately both for the talk amplifier 40 and the listen amplifier 44. Switches are provided to allow the user to configure the privacy device 10 for various handset signal polarities and impedances. The device is powered by a standard 115 VAC power supply.

The privacy device 10 can be used in various ways to enhance privacy and reduce nuisance to third parties in the vicinity. For example, the privacy device 10 allows the user to speak softly into the handset microphone, and then to amplify the microphone signal supplied to the telephone base to a normal level. In this way confidentiality is provided and the user's contribution to the surrounding noise level is reduced.

The privacy device also allows the user to amplify the speaker signal containing the third party's communication. This feature allows the user to hear a transmitted message more clearly in a noisy environment. The privacy device also provides additional assistance to the hearing impaired.

Of course, it should be understood that a wide range of changes and modifications can be made to the preferred embodiment described above. The connectors 54, 56 provide the advantage of eliminating all wiring. However, in applications where the privacy device is installed either as original equipment or by a skilled person, other types of connectors such as conductors which are soldered permanently in place may be substituted for the modular telephone connectors described above. Furthermore, the various features of this invention can be used separately from one another. For example, the side tone suppression circuit can be used in a system that does not provide a signal strength meter.

Moreover, the functions described above can be implemented in a wide variety of circuits and using a wide variety of amplification and control techniques. The preferred embodiment described above is merely one example of how this invention can be adapted using one particular approach. Those skilled in the art will recognize that the functions described above can be implemented in many different ways, depending upon the requirements of the particular application.

In this specification and the following claims, various signals are described as transmitted or received, or as responsive to or varying in accordance with other signals. In all cases, such language is intended to be interpreted broadly to allow for buffering, filtering, amplification, signal shaping, analog-to-digital conversion, and the like.

It is therefore intended that the foregoing detailed description be regarded as illustrative rather than limiting, and that it be understood that it is the following claims, including all equivalents, which are intended to define the scope of this invention.

We claim:

1. A telephone privacy device for a telephone comprising a base and a handset, said device comprising:

a first connector configured to receive a microphone signal from a microphone included in the handset;

a variable amplifier coupled to the first connector to receive the microphone signal and to generate an amplified microphone signal, said variable amplifier comprising a user adjustable volume control element effective to adjust amplification of the variable amplifier to an adjustable degree;

a signal strength display responsive to the amplified microphone signal to provide a visual indication of signal strength of the amplified microphone signal to a user; and a second connector coupled to the variable amplifier to transmit the amplified microphone signal to the base.

2. The invention of claim 1 wherein the visual display comprises a plurality of LED's.

3. The invention of claim 1 wherein the variable amplifier is coupled to the first connector via an interface circuit, and wherein the interface circuit comprises a plurality of resistors and a switch operative to connect a selected one of the resistors to the microphone signal to provide a selected impedance.

4. The invention of claim 3 wherein the interface circuit further comprises a polarity reversing switch operable by the user to reverse polarity of the microphone signal.

5. The invention of claim 1 wherein the second connector is configured to receive a speaker signal from the telephone base, wherein the first connector is configured to transmit an amplified speaker signal to a speaker included in the handset, and wherein the device further comprises a second amplifier responsive to the speaker signal from the second connector to supply the amplified speaker signal to the first connector.

6. The invention of claim 5 wherein the second amplifier comprises a second adjustable volume control element effective to adjust amplification of the second amplifier.

7. The invention of claim 5 further comprising a side tone suppression circuit having an input responsive to the amplified microphone signal and an output coupled to the second amplifier to supply a side tone suppression signal to the second amplifier that varies in amplitude in response to the amplified microphone signal.

8. The invention of claim 1 further comprising a housing containing the first and second connectors, the variable amplifier, and the signal strength display, said housing comprising an upper surface shaped to support the telephone base.

9. The invention of claim 8 wherein the housing comprises a front panel, and wherein the volume control element and the visual display are positioned at the front panel.

10. The invention of claim 1 wherein the first and second connectors comprise respective modular telephone receptacles.

11. A telephone privacy device for a telephone comprising a base and a handset, said device comprising:

a first connector configured to receive a voice signal from a microphone included in the handset and to supply an amplified speaker signal to a speaker included in the handset;

a variable amplifier coupled to the first connector to receive the microphone signal and to generate an amplified microphone signal, said variable amplifier comprising a user adjustable volume control element effective to adjust amplification of the variable amplifier to an adjustable degree;

a second connector coupled to the variable amplifier to transmit the amplified microphone signal to the telephone base, said second connector further configured to receive a speaker signal from the telephone base;

a second amplifier responsive to the speaker signal from the second connector and operative to supply the amplified speaker signal to the first connector;

a side tone suppression circuit having an input responsive to the amplified microphone signal and an output coupled to the second amplifier to supply a side tone suppression signal to the second amplifier that varies in amplitude in response to the amplified microphone signal.

12. The invention of claim 11 wherein the second amplifier comprises a second adjustable volume control element effective to adjust amplification of the second amplifier.

13. The invention of claim 12 further comprising:

a signal strength display indicating volume of a displayed signal; and a display switch manually controllable to apply a signal responsive to a selectable one of the amplified microphone signal and the amplified speaker signal to the signal strength display as the displayed signal.

14. The invention of claim 13 further comprising a housing containing the first and second connectors, the variable amplifier, the second amplifier, and the side tone suppression circuit; said housing comprising an upper surface shaped to support the telephone base.

15. The invention of claim 14 wherein the housing comprises a front panel, and wherein the volume control elements, the signal strength display and the display switch are positioned at the front panel.

16. The invention of claim 15 wherein the first and second connectors comprise respective modular telephone receptacles.

17. A telephone privacy device for a telephone comprising a base and a handset, said device comprising:

a first connector configured to receive a voice signal from a microphone included in the handset and to supply an amplified speaker signal to a speaker included in the handset;

a variable amplifier coupled to the first connector to receive the microphone signal and to generate an amplified microphone signal, said variable amplifier comprising a user adjustable volume control element effective to adjust amplification of the variable amplifier to an adjustable degree;

a second connector coupled to the variable amplifier to transmit the amplified microphone signal to the telephone base, said second connector further configured to receive a speaker signal from the telephone base;

a second amplifier responsive to the speaker signal from the second connector and operative to supply the amplified speaker signal to the first connector;

said second amplifier having a gain substantially independent of said adjustable volume control element.

18. The invention of claim 17 wherein the second amplifier comprises a second adjustable volume control element effective to adjust amplification of the second amplifier.

19. The invention of claim 18 further comprising:

a signal strength display indicating volume of a displayed signal; and a display switch manually controllable to apply a signal responsive to a selectable one of the amplified microphone signal and the amplified speaker signal to the signal strength display as the displayed signal.

20. The invention of claim 19 further comprising a housing containing the first and second connectors, the variable amplifier, the second amplifier, and the side tone suppression circuit; said housing comprising an upper surface shaped to support the telephone base.

21. The invention of claim 20 wherein the housing comprises a front panel, and wherein the volume control elements, the signal strength display and the display switch are positioned at the front panel.

22. The invention of claim 21 wherein the first and second connectors comprise respective modular telephone receptacles.

* * * * *